United States Patent [19]

Wakui et al.

[11] Patent Number: 4,555,170

[45] Date of Patent: Nov. 26, 1985

[54] DEVICE FOR ILLUMINATING DISPLAY UNIT IN VIEWFINDER

[75] Inventors: Yoshio Wakui; Kiyoshi Negishi; Eiichi Tano, all of Tokyo, Japan

[73] Assignee: Asahi Kogaku Kogyo Kabushiki Kaisha, Tokyo, Japan

[21] Appl. No.: 689,265

[22] Filed: Jan. 7, 1985

[30] Foreign Application Priority Data

Jan. 23, 1984 [JP] Japan .................................. 59-8486

[51] Int. Cl.⁴ ...................... G03B 17/18; G03B 17/20
[52] U.S. Cl. ...................................... 354/470; 362/5; 362/29; 362/30
[58] Field of Search ...................... 362/3, 5, 28, 29, 30, 362/800; 354/470, 471, 472, 474, 475

[56] References Cited

U.S. PATENT DOCUMENTS

| | | | |
|---|---|---|---|
| 4,074,292 | 2/1978 | Nakamoto et al. | 354/474 |
| 4,118,712 | 10/1978 | Kawasaki | 354/471 |
| 4,149,795 | 4/1979 | Sakurada et al. | 354/475 |
| 4,302,086 | 11/1981 | Suzuki et al. | 354/472 |
| 4,313,657 | 2/1982 | Tokutomi et al. | 354/474 |
| 4,334,220 | 6/1982 | Suzuki et al. | 354/472 |
| 4,396,263 | 8/1983 | Yamada | 354/471 |
| 4,450,506 | 5/1984 | Hasegawa | 362/5 |
| 4,457,612 | 7/1984 | Suzuki et al. | 354/471 |
| 4,461,560 | 7/1984 | Yoshino et al. | 354/475 |

FOREIGN PATENT DOCUMENTS

| | | | |
|---|---|---|---|
| 145525 | 11/1979 | Japan | 354/474 |
| 40817 | 4/1981 | Japan | 354/474 |

Primary Examiner—Ira S. Lazarus
Attorney, Agent, or Firm—Sughrue, Mion, Zinn, Macpeak, and Seas

[57] ABSTRACT

A device for controlling a light source in a viewfinder of a camera, such as may be used for illuminating a liquid crystal display unit, having a simple operation and which is saving of power. An operating switch is provided for operating the light source. A timer is initiated when the operating switch is turned off. The light source is maintained turned on while the operating switch is turned on and while the timer is operating, and the light source is turned off when the operating switch is turned on during the operation of the timer.

4 Claims, 3 Drawing Figures

DEVICE FOR ILLUMINATING DISPLAY UNIT IN VIEWFINDER

BACKGROUND OF THE INVENTION

The present invention relates to a device for illuminating a display unit such as a liquid crystal display (LCD) unit used to display exposure data or the like in the viewfinder of a camera.

Heretofore, exposure data and the like has been displayed with a mechanical meter, a light-emitting diode (LED) display unit or an LCD unit in the viewfinder of a camera. In the case where a mechanical meter is employed, the mechanical meter must be sufficiently small in size that it can be built into the camera, and it should be so designed that the needle is deflected by small current. Such a mechanical meter can relatively easily be broken by physical impact or damaged by vibration. An LED unit is free from such a drawback because it, unlike the mechanical meter, has no movable parts. However, the LED is disadvantageous in that the electric power consumption thereof is relatively large.

In order to eliminate the above-described drawbacks accompanying mechanical meters and LED display units, recently, a display system using a liquid crystal display (LCD) unit has been proposed. An LCD unit, like an LED, has no movable components. Therefore, the LCD unit cannot easily be damaged by mechanical impact. Moreover, it has a lower power consumption compared with an LED unit. However, in the case where a photographing operation is carried out at a dark place, it is rather difficult to read the display effected by the LCD unit, and therefore it is necessary to provide an illuminating device for the LCD unit.

A conventional illuminating device for illuminating an LCD unit is designed so that an operating switch is turned on to activate a light source (lamp), and the light source is turned off immediately when the operating switch is turned off. However, this device is disadvantageous in that, since the photographer must adjust the aperture value and the shutter speed while referring to the exposure data displayed in the view finder, in a photographing operation at a dark place, he must adjust the camera while depressing the operating switch. This is considerably troublesome. In order to eliminate this difficulty, a method has been proposed in which the illuminating device is provided with a timer which starts when the operating switch has been released. However, that method is still disadvantageous in that it is difficult to establish an illumination time period adequate for all situations, and also electric power may be wasted because the light source is liable to be kept turned on after the photographing operation has been completed.

SUMMARY OF THE INVENTION

An object of this invention is to eliminate the above-described difficulties accompanying a conventional device for illuminating a display unit in the viewfinder of a camera.

More specifically, an object of the invention is to provide a device for illuminating a display unit in the viewfinder of a camera in which the power consumption required for the light source is minimized.

The foregoing and other objects of the invention have been achieved by the provision of a device for illuminating a display unit in the viewfinder of a camera which is designed so that, even after the operating switch is released (turned off), the light source is kept on while a timer is operating, and the light source is turned off immediately when the operating switch is turned on again during the operation of the timer.

DESCRIPTION OF THE PREFERRED EMBODIMENTS

Preferred embodiments of the invention will be described with reference to the accompanying drawings.

Figure 1:
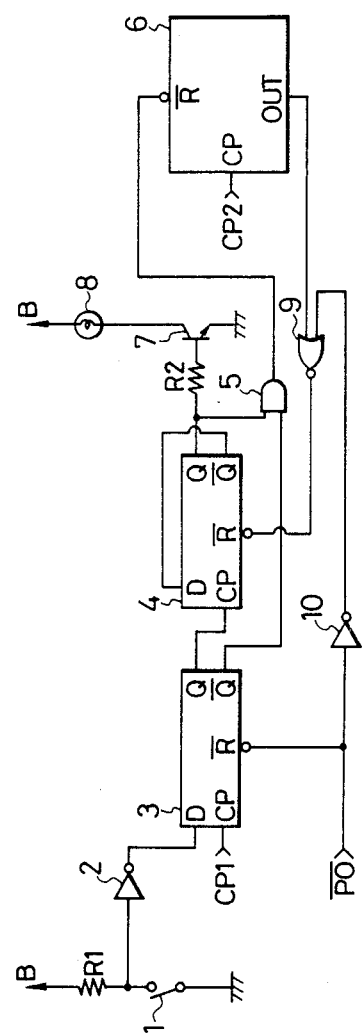
FIG. 1 is a circuit diagram of a preferred embodiment of an illuminating display unit of the invention.

FIG. 1 is a circuit diagram showing a preferred embodiment of an illuminating device of the invention. An operating switch 1 for illumination has one terminal grounded and the other terminal connected through resistor R1 to a power source and through an inverter 2 to the D input terminal of a first D flip-flop 3. A clock signal pulse signal CP1 is applied to the CP input terminal (clock terminal) of the first D flip-flop 3, and a power on reset signal $\overline{PO}$ is applied to the $\overline{R}$ input terminal (reset terminal) of the D flip-flop 3. The Q output of the first D flip-flop 3 is applied to the CP input terminal of a second D flip-flop 4. The $\overline{Q}$ output of the second D flip-flop 4 is applied to the D input terminal thereof. The $\overline{Q}$ output of the first D flip-flop 3 and the Q output of the second flip-flop 4 are applied to an AND gate 5, the output of which is applied to the $\overline{R}$ input terminal (reset terminal) of a counter 6. The Q output of the second D flip-flop 4 is applied through a resistor R2 to the base of a transistor 7. The collector of the transistor 7 is connected through a lamp 8 to the power source B, and the emitter thereof is grounded. A clock pulse signal CP2 is applied to the CP input terminal of the counter 6. The output terminal OUT of the counter 6 is connected to one input terminal of a NOR gate 9. The power on reset signal $\overline{PO}$ is applied through an inverter 10 to the other input terminal of the NOR gate 9. The output of the NOR gate 9 is applied to the $\overline{R}$ terminal of the second D flip-flop circuit 4.

The first and second D flip-flops 3 and 4 and the counter 6 will be described in more detail. The D flip-flops 3 and 4 are positive-edge trigger bistable circuits. The counter 6 starts counting the rising or falling edges of the clock pulse signal CP2 upon release of the reset condition. When the count value reaches a predetermined value, the counter 6 sets the output signal OUT to a high logic level "H" from a low logic level "L".

Figure 2:
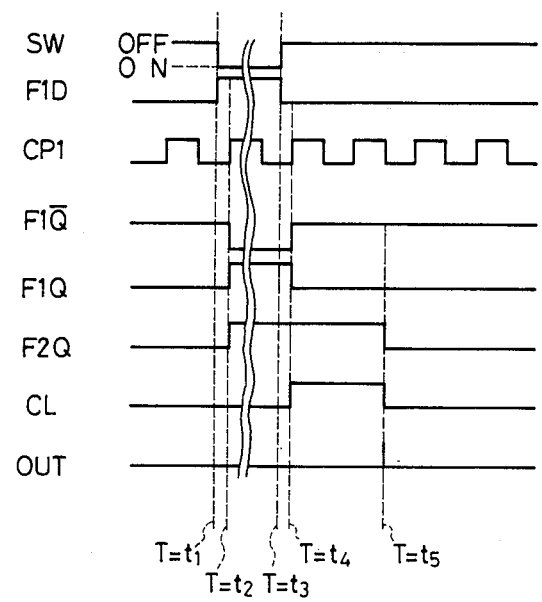
FIGS. 2 and 3 are timing charts for a description of the operation of the embodiment shown in FIG. 1.
Figure 3:
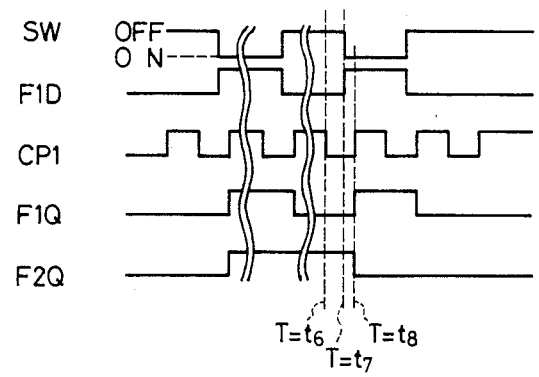

FIGS. 2 and 3 are timing charts for a description of the operation of the circuit shown in FIG. 1. First, the operation whereby the operating switch 1 is closed (the control signal of the switch 1 being designated by SW) to turn on the lamp 8 and then the lamp 8 is turned off by the counter 6 will be described with reference to FIG. 2.

When the power switch is turned on, the first and second D flip-flops 3 and 4 are reset by the power on reset signal $\overline{PO}$ so that the outputs thereof are set to "L" while the $\overline{Q}$ outputs thereof are raised to "H" (before the time instant $T=t_1$). When the operating switch 1 is closed at the time instant $T=t_1$, the D terminal input (hereinafter referred to as F1D) of the first D flip-flop 3 is raised to "H". The Q output terminal of the first flip-flop 3 (hereinafter referred to as F1Q) rises in synchronization with the first rise of the clock pulse signal CP1 (at the time instant T=t$_2$). F1Q is applied to the CP input terminal of the second flip-flop 4 and the high logic level $\overline{Q}$ output of the second flip-flop 4 at that time is applied to the D input terminal of the second flip-flop 4. Therefore, at the time instant T=t$_2$, the Q output of the second flip-flop 4 (hereinafter referred to as F2Q) rises. When F2Q is at "H", base current flows in the transistor 7, that is, the transistor 7 is rendered conductive so that the lamp 8 is turned on.

When the operating switch 1 is opened at the time instant T=t$_3$, F1D of the first D flip-flop 3 falls. Thereafter, F1Q is set to "L" in synchronization with the first rise of the clock pulse signal CP1 (at the time instant T=t$_4$). At the fall of F1Q, F2Q is not changed, and therefore the lamp 8 is maintained turned on. At the time instant T=t$_4$, both the $\overline{Q}$ terminal output (F1$\overline{Q}$) of the first D flip-flop 3 and F2Q are raised to "H" for the first time so that the reset state of the counter 6 is released (the release signal being designated by CL), and the output signal OUT of the counter 6 is raised to "H" from "L" in a period of time (at the time instant T=t$_5$) determined by the arrangement of the counter 6 and the frequency of the clock pulse signal CP2. This output signal OUT is applied through the NOR gate 9 to the $\overline{R}$ terminal of the second D flip-flop 4 to reset the latter. As a result, F2Q is set to "L" from "H" so that the transistor 7 is rendered nonconductive to turn off the lamp 8. As is apparent from the above description, the timer operation of the counter starts when the operating switch 1 is opened after being closed.

The operation whereby, while the lamp 8 is being turned on by the action of the counter 6, the operating switch 1 is closed and the lamp 8 is turned off will be described with reference to FIG. 3. At the time instant T=t$_6$, the operating switch 1 after being closed, is opened to turn on the lamp 8. When the operating switch 1 is closed again at the time instant T=t$_7$, which occurs before the counter 6 provides the output signal OUT, F1D is raised to "H" from "L". In synchronization with the rise of the first clock pulse signal CP1 after the time instant T=t$_7$, that is, at the time instant T=t$_8$, F1Q is raised to "H" from "L". F1Q is applied to the CP input terminal of the second D flip-flop 4 so that the state of the second D flip-flop 4 is changed in synchronization with the rise of F1Q. Therefore, F2Q is set to "L" from "H" so that the transistor 7 is rendered nonconductive to turn off the lamp 8.

As is apparent from the above description, the device of the invention is designed so that, even after the operating switch is turned off, the lamp is maintained turned on for the duration of the timer operation, and if the operating switch is turned on again during the timer operation, the lamp is turned off immediately. Accordingly, with the device for illuminating a display unit in the viewfinder of a camera according to the invention, the electric power required for the light source is minimized. Moreover, the operator of the camera, being relieved from the burden of turning on and off the illuminating device, can apply himself to the operation of setting the aperture or shutter of the camera.

We claim:

1. A device for controllably illuminating a display unit in the viewfinder of a camera, comprising:
    a light source for illuminating said display unit in said viewfinder;
    an operating switch for operating said light source;
    a timer which, when said operating switch is turned off, operates for a predetermined period of time; and
    lighting circuit means for maintaining said light source turned on while said operating switch is turned on and while said timer is operating, said lighting circuit turning off said light source when said operating switch is turned on during operation of said timer.

2. The device for controllably illuminating a display unit of claim 1, wherein said timer comprises a binary counter.

3. The device for controllably illuminating a display unit of claim 2, wherein said lighting circuit means comprises: first and second D-type flip-flops, a D input of said first flip-flop being coupled to one terminal of said operating switch, a Q output of said first flip-flop being coupled to a CP input of said second flip-flop, and a $\overline{Q}$ of said second flip-flop being coupled to a D input of said second flip-flop; an AND gate having a first input coupled to a $\overline{Q}$ output of said first flip-flop and a second input coupled to a Q output of said second flip-flop, an output of AND gate being coupled to a reset input terminal of said counter; a NOR gate having an output coupled to a reset input terminal of said second flip-flop and a first input coupled to an output terminal of said counter; and an inverter having an input coupled to a reset input terminal of said first flip-flop and an output coupled to a second input of said NOR gate, a reset signal being applied to said reset input terminal of said first flip-flop and a clock pulse signal being applied to a CP input terminal of said first flip-flop.

4. The device for controllably illuminating a display unit of claim 3, further comprising: transistor drive means for a controlling current flow through said light source in response to a signal on said Q output terminal of said second flip-flop.

* * * * *